(12) United States Patent
Bichler et al.

(10) Patent No.: US 8,749,080 B2
(45) Date of Patent: Jun. 10, 2014

(54) ELECTRIC OPERATING SYSTEM FOR OPERATING AT LEAST ONE ELECTRIC EQUIPMENT FOR A WORK MACHINE AND WORK MACHINE COMPRISING AN ELECTRIC OPERATING SYSTEM

(75) Inventors: Oliver Bichler, Pluwig (DE); Alfred Richter, Eisenach (DE); Günther Steinbrecher, Andemach (DE)

(73) Assignee: Volvo Construction Equipment AB, Eskilstuna (SE)

( * ) Notice: Subject to any disclaimer, the term of this patent is extended or adjusted under 35 U.S.C. 154(b) by 50 days.

(21) Appl. No.: 13/389,813

(22) PCT Filed: Aug. 13, 2009

(86) PCT No.: PCT/SE2009/000379
§ 371 (c)(1),
(2), (4) Date: Mar. 30, 2012

(87) PCT Pub. No.: WO2011/019307
PCT Pub. Date: Feb. 17, 2011

(65) Prior Publication Data
US 2012/0292918 A1 Nov. 22, 2012

(51) Int. Cl.
*F02B 63/04* (2006.01)
(52) U.S. Cl.
USPC ........................................................ 290/1 R
(58) Field of Classification Search
USPC ........................................................ 290/1 R
See application file for complete search history.

(56) References Cited

U.S. PATENT DOCUMENTS

| 2006/0118157 | A1 | 6/2006 | Johnson et al. | |
|---|---|---|---|---|
| 2008/0099257 | A1 | 5/2008 | Betz et al. | |
| 2008/0239612 | A1* | 10/2008 | Zhang et al. | 361/144 |
| 2009/0113888 | A1* | 5/2009 | Kuttler et al. | 60/486 |
| 2010/0021281 | A1* | 1/2010 | Nelson | 415/30 |

FOREIGN PATENT DOCUMENTS

EP 1775392 A2 4/2007

OTHER PUBLICATIONS

JP 2003235208 A; Sumitomo (Shi)Construction Machinery Manufacturing Co Ltd. Aug. 22, 2003: (abstract).
International Search Report for corresponding International App. PCT/SE2009/000379, May 2010.
International Preliminary Report on Patentability for corresponding International App. PCT/SE2009/000379, Sep. 2010.

* cited by examiner

*Primary Examiner* — Tho D Ta
(74) *Attorney, Agent, or Firm* — WRB-IP LLP

(57) ABSTRACT

An electric operating system for operating at least one electric equipment article for a work machine is provided. This electric operating system includes a flywheel generator for generating electric power needed for the operation of the at least one electric equipment article. Further, the system includes a power electronic device connected to the output of the flywheel generator for adapting a voltage level provided by the flywheel generator to a voltage level required for the operation of the at least one electric equipment article. Finally, the system includes a connector device adapted for to be connectable to the power electronic device and the at least one electric equipment article when the at least one electric equipment article is attached to, or arranged at, the work machine for providing the at least one electric equipment article with electric power at the adapted voltage level.

11 Claims, 3 Drawing Sheets

ELECTRIC OPERATING SYSTEM FOR OPERATING AT LEAST ONE ELECTRIC EQUIPMENT FOR A WORK MACHINE AND WORK MACHINE COMPRISING AN ELECTRIC OPERATING SYSTEM

BACKGROUND AND SUMMARY

The invention relates to an electric operating system for operating at least one electric equipment article for a work machine and a work machine comprising an electric operating system.

JP 2003235208 A discloses a system for a work machine where a motor-generator is integrated in a flywheel housing of the engine. During low load operation of the engine, the motor-generator operates in a generator mode charging a dc battery. During high load operation of the engine, the motor-generator is operating in a motor mode and drives an actuator of the work machine while the electric power is supplied to the motor generator by the dc battery.

It is known in the art that there are many different equipments (also called attachments or tools) that can be attached to, or arranged at, a working machine and are operated by the operator of the working machine. These equipments or tools are especially adapted for the purpose they are made for. Particularly, there are electric equipment articles or tools known, which can be magnetized by an electric current flow, such as a magnetic plate, or which can be electrically driven, for instance by an electric motor, such as an auxiliary water pump. In the latter example, the usual hydrostatic driving means can be replaced by electrically driven means (e.g. said electric motor). Often, a separate generator is mounted on the work machine for generating electric power needed for the operation of such electric or electrically driven tools.

It is desirable to provide an electric operating system adapted for the use in, on, at or in connection with a work machine which is compact and has a high reliability against failure.

It is also desirable to provide a work machine comprising such a reliable and compact electric operating system.

In a first aspect of the invention an electric operating system is provided for operating at least one electric equipment article for a work machine, wherein the at least one electric equipment article is an attachment device, that is attachable to, or arrangeable at, the work machine, or wherein the at least one electric equipment article is an auxiliary device which is electrically drivable by an electric motor. The system comprises a flywheel generator for generating electric power needed for the operation of the at least one electric equipment article Further, the system comprises an power electronic device connected to the output of the flywheel generator for adapting a voltage level provided by the flywheel generator to a voltage level required for the operation of the at least one electric equipment article. Finally, the system comprises a connector device adapted for to be connectable to the power electronic device and the at least one electric equipment article when the at least one electric equipment article being attached to, or arranged at, the work machine for providing the at least one electric equipment article with electric power at the adapted voltage level.

The flywheel is used as a generator producing the electric power needed for the operation of the one or more electric equipment articles attached to, or arranged at, the work machine. In a preferred embodiment of the invention, the flywheel generator is integrated in the combustion engine of the vehicle. This has the advantage that there is virtually no extra space needed for the electric power source supplying the electric power for said electric equipment articles. Particularly, said electric equipment article can enclose tools which are drivable by an electric motor or which are magnetized by an electric current, such as a magnetic plate attachment, which can be supplied by the flywheel generator. Auxiliary components such as a water pump can also be driven by the flywheel generator as electric power source instead of a usual hydrostatic source. Fault-prone gear belts or hoses can be avoided which improves the reliability of the operation of such a work machine. Correspondingly, the operation comfort for the operator is increased.

Expediently, the flywheel is not used as a motor generator but is only working as a generator supplying electric power during its operation thereby functioning as an electric power source particularly for electric equipment articles or tools attached to, or arranged at, the work machine and drivable by an electric motor or magnetizable by an electric current. Favourably, the flywheel generator can even replace a hydrostatic power source for driving tools. The flywheel generator can also provide electric energy for external devices which are not attached to the work machine.

The work machine can be a mobile machine or construction equipment, e.g. on wheels or on tracks, or a stationary machine or construction equipment. In one (exemplary) advantageous application, it can be an excavator or wheel loader or any other earth moving machine.

According to a favourable embodiment of the invention adapted to work machines equipped with a combustion engine the flywheel generator can be arranged on an output shaft of the combustion engine of the working machine, preferably an output shaft between the combustion engine and a hydraulic pump, for generating electric power. One major advantage of this arrangement is that it is compact and reliable in its operation. The flywheel generator is small and is virtually integrated into the overall space needed for the combustion engine.

According to a favourable embodiment of the invention an energy buffer can be coupled to the flywheel generator. The electric equipment can be operated in a stable way independent on an actual load on a drive shaft of the engine.

Expediently, the energy buffer can serve (i) as an additional or back-up power source for compensating any limitations in the supply of electric power by the flywheel generator in case of temporarily increased power consumption spikes and (ii) as a safety system in case the flywheel generator has a malfunction. Further, a DC supply is available for tools and attachments requiring such a DC supply.

According to a favourable embodiment of the invention the energy buffer is chargeable by the flywheel generator separate from a charging system of a starter battery of the combustion engine. The energy buffer can be a storage battery with an electric potential of advantageously, at least twice of the electric potential of the starter battery. Particularly, the energy buffer can have an electric potential between ca. 50 and ca. 1000 Volt, in particular between ca. 100 and ca. 800 Volt and preferably between one of the ranges: (i) ca. 100 to ca. 150 Volt, (ii) ca. 180 to ca. 250 Volt, (iii) ca. 350 to ca. 450 Volt, and (iv) ca. 500 to ca. 800 Volt.

Compared to starter battery systems which operate in the range of 12 to 24 Volts a higher voltage level for operating the electric equipment article allows for a high electric power at a reasonable electric current level which favourably requires only a small electric motor compared to lower voltage levels with higher currents at the same electric power level.

According to a favourable embodiment of the invention the electric equipment article can be a magnetic plate. Favourably, the magnetic plate can be magnetized by an electric current flow supplied by the flywheel generator and automatically demagnetized when the electric power source, i.e. the flywheel generator is switched off or is (together with any electric energy buffer connected to the electric operating system) electrically disconnected from the magnetic plate.

Alternatively, the electric equipment article can be a device in the work machine which is driveable by an electric motor, such as a compressor for an air conditioning system (AC compressor), a cooling fan and the like. Particularly, an auxiliary water pump can be supplied with electric power by the flywheel generator for its pumping operation.

According to another aspect of the invention a work machine comprising a combustion engine and an electric operating system is provided for operating at least one electric equipment article attached to or arranged at said work machine, wherein the electric operating system comprises a flywheel generator for generating electric power needed for the operation of the at least one electric equipment article. Further, the system comprises an power electronic device connected to the output of the flywheel generator for adapting a voltage level provided by the flywheel generator to a voltage level required for the operation of the at least one electric equipment article. Finally, the system comprises a connector device adapted for to be connectable to the power electronic device and the at least one electric equipment article when the at least one electric equipment article being attached to, or arranged at, the working machine for providing the at least one electric equipment article with electric power at the adapted voltage level. One major achievement of the invention used in, on, at or in connection with such a working machine is that a high comfort can be provided for the operator of the work machine when using said electric equipment article. As no additional generator has to be attached to the work machine, another major achievement of the invention is that noise during operation of the equipment is reduced and a reliable electric power source is provided for the operation of said electric equipment article.

According to a favourable embodiment of the invention the at least one electric equipment article or tool can be a magnetic plate magnetized by an electromagnet.

Alternatively, the electric equipment article can be driven by an electric motor.

According to a favourable embodiment of the invention at least one additional energy buffer can be provided wherein the additional energy buffer is charged by the flywheel generator separate from a starter battery of the combustion engine.

Favourably, a connector device can be provided for connecting other electric consumers to the flywheel generator, such as a head light, a search light, a working light, a pump, an AC compressor, a cooling fan and the like.

BRIEF DESCRIPTION OF THE DRAWINGS

The present invention may best be understood from the following detailed description of the embodiment(s), but not restricted to the embodiments, shown in the Figures wherein is shown schematically.

DETAILED DESCRIPTION

Figure 1:
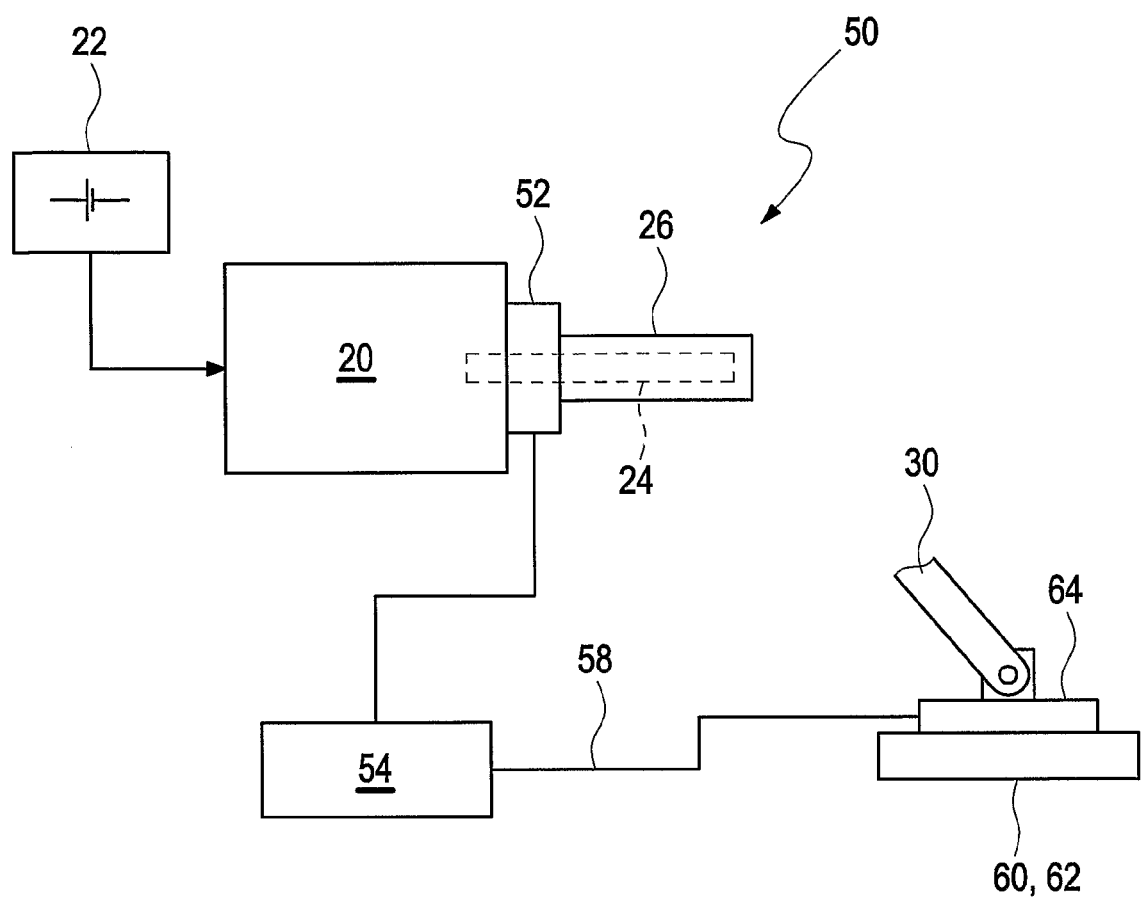
FIG. 1 a preferred example embodiment of an electric operating system according to the invention comprising a magnetic plate as electric attachment device.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

Figure 3:
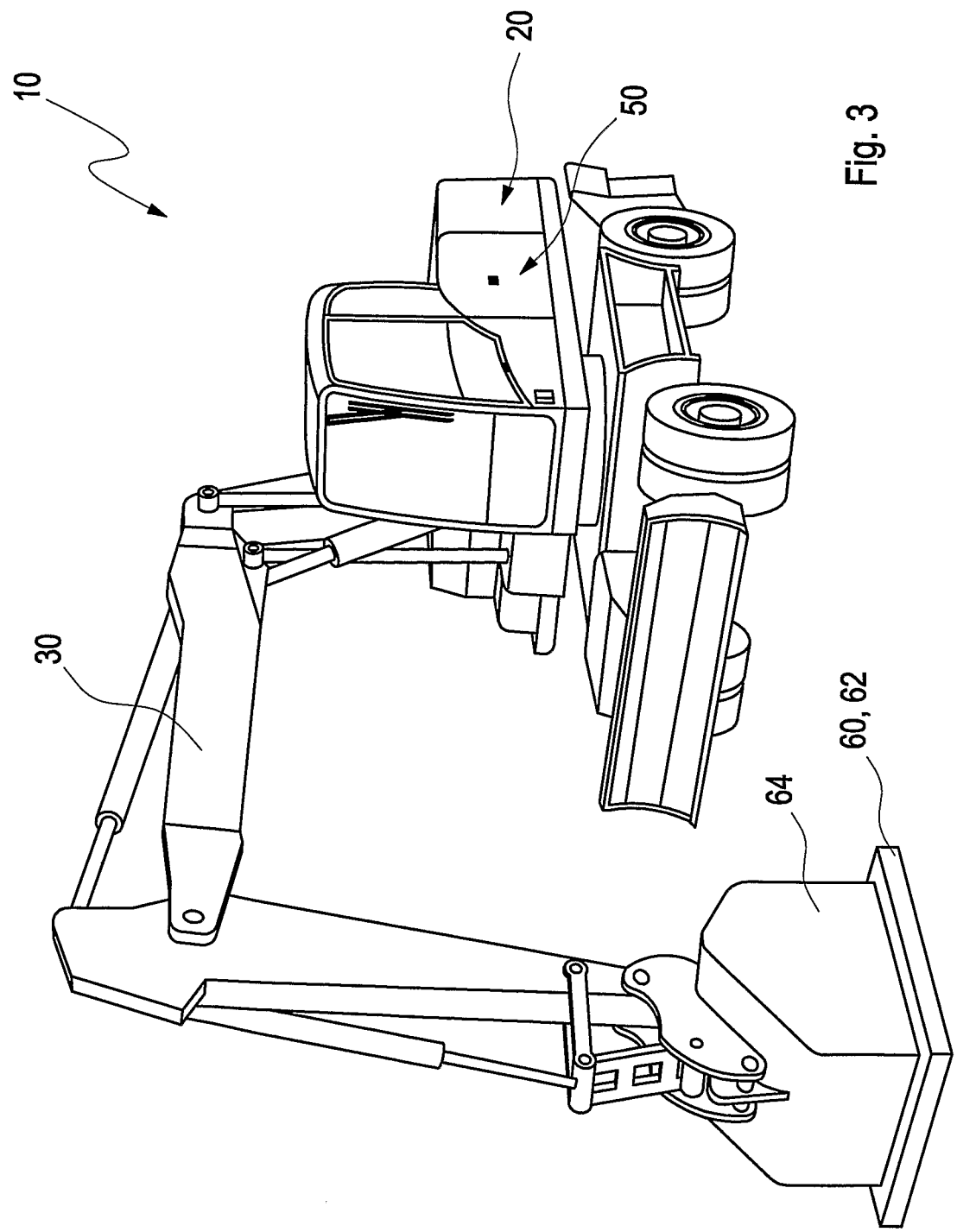
FIG. 3 an example embodiment of a work machine equipped with a preferred embodiment of the electric operating system according to the invention.

FIG. 1 depicts schematically an electric operating system 50 for operating one or more electric equipment articles 60 attached to, or arranged at, a work machine 10 (FIG. 3), wherein the electric equipment article 60 is embodied (by way of example) as a magnetic plate 62 magnetized by an electromagnet 64 and attached to an arm 30 of the work machine 10 (FIG. 3). The working machine 10 is equipped with a combustion engine 20.

A flywheel generator 52 for generating the electric power needed for the operation of the electric equipment article 60 is arranged at an output side of the combustion engine 20, for instance on the output shaft 24 between the combustion engine 20 and a hydraulic pump 26. Alternatively, the flywheel generator 52 can be flanged on the combustion engine 20 and the hydraulic pump 26 flanged on the flywheel generator 52.

Typically, the combustion engine 20 is provided with a starter battery 22 for starting the combustion engine and supplying electric power for the usual on-board electrical systems (not shown) of the work machine 10.

The construction of flywheel generators 52 is generally known in the art. For instance, inside a flywheel housing permanent magnets can be arranged at the flywheel (not shown) which are operationally coupled to stator coils inside the flywheel housing (not shown). When the flywheel rotates, i.e. when for instance the permanent magnets of the flywheel rotate inside the stator coils of the flywheel, electric power is generated in ways generally well-known in the art.

A power electronic device 54 is provided for adapting a voltage level provided as output voltage by the flywheel generator 52 to a voltage level required for the operation of the electric equipment article 60. A connector device 58 connects the power electronic device 54 with the electric equipment article 60 so that the electric equipment article 60 can be supplied with electric power when attached to, or arranged at, the work machine 10.

Suitable power electronic devices 54 employed may be, for instance, AC/DC or AC/AC converters known in the art as for instance PWM (or PDM), PFM, PSM converters (AC=alternating current; DC=direct current; PWM=pulse-width-modulation; PDM=pulse-duration-modulation, PFM=pulse-frequency-modulation; PSM=pulse-step modulation).

Figure 2:
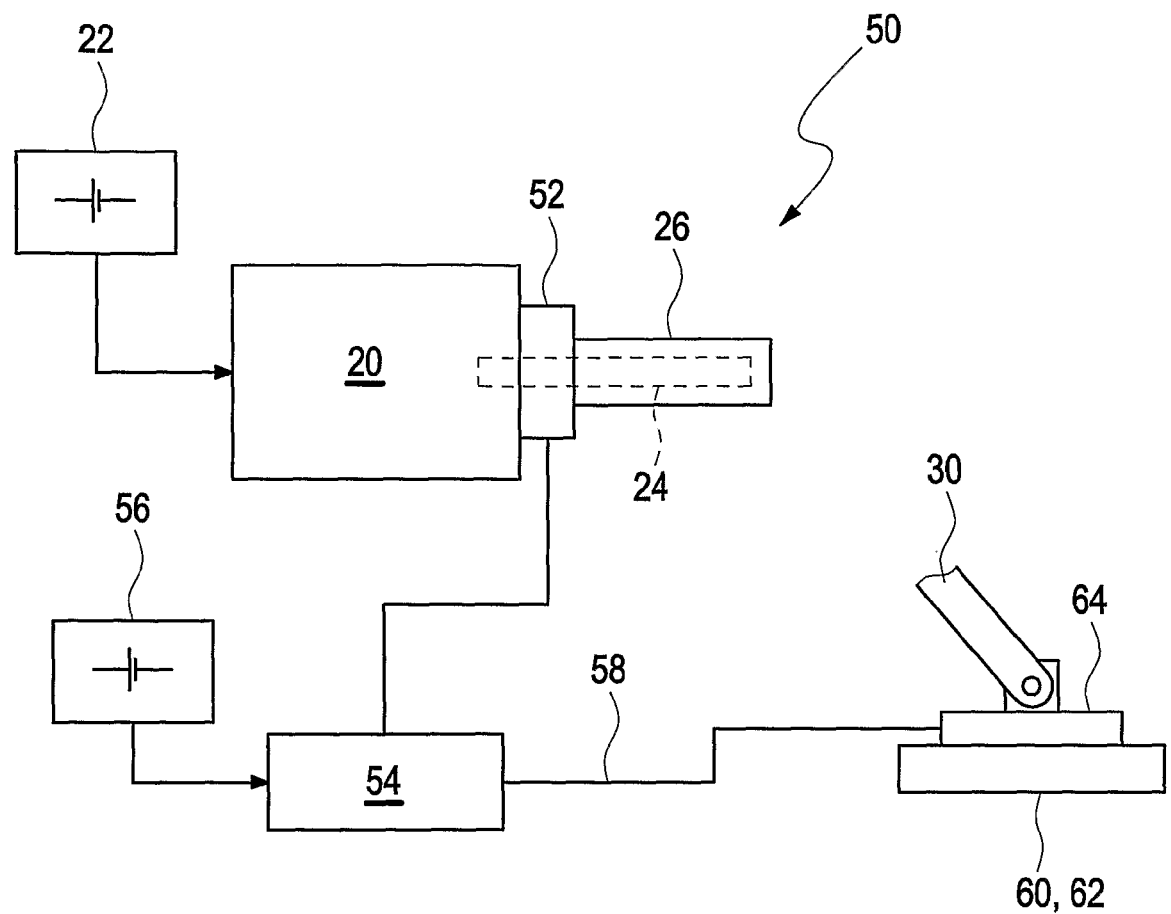
FIG. 2 an advantageous further improvement of the example embodiment of an electric operating system of FIG. 1 comprising additionally an energy buffer.

As depicted in FIG. 2, advantageously, an energy buffer 56 is added to the electric operating system according to FIG. 1 which energy buffer 56 is coupled in a way generally known in the art to the power electronic device 54. The energy buffer 56 can compensate variations in the supply of electric power of the flywheel 52 caused by corresponding variations of the rotation of the flywheel 52 which in turn can be a consequence of variations in the operation of the combustion engine 20 and/or the hydraulic system (not shown) of the work machine 10 connected to the hydraulic pump 26.

The energy buffer 56 is chargeable by the flywheel generator 52 separate from the charging system of the starter battery 22 of the engine 20. The energy buffer 56 can be a storage battery with an electric potential of at least twice of the electric potential of the starter battery 22. Particularly, the energy buffer 56 can have an electric potential between ca. 50 and ca. 1000 Volt, in particular between ca. 100 and ca. 800 Volt and preferably between one of the ranges: (i) ca. 100 to ca. 150 Volt, (ii) ca. 180 to ca. 250 Volt, (iii) ca. 350 to ca. 450 Volt, and (iv) ca. 500 to ca. 800 Volt. Electrically driven equipments as the electric equipment article 60 are typically, or will possibly in the future be, operated in such voltage ranges.

FIG. 3 illustrates an example embodiment of a work machine 10 which is equipped with an electric operating system for electric equipment article 50 according to the invention. The work machine 10 comprises for instance an electric equipment article 60 such as an attachment comprising a magnetic plate 62 that is magnetized by an electromagnet 64.

Generally, the electric operating system 50 provides drive power for one or more electric equipment article or tools 60 which are drivable by an electric motor or which are powered by electric current such as the magnetic plate 62 mentioned above. Moreover, the electric operating system 50 allows for supplying drive power to auxiliary systems which are conventionally driven by other sources such as hydrostatic means as, by way of example, a water pump or the like.

The invention claimed is:

1. An electric operating system for operating at least one electric equipment article for a work machine, the work machine comprising a combustion engine defining a combustion engine space, comprising
   (i) a flywheel generator for generating electric power needed for the operation of the at least one electric equipment article, wherein the at least one electric equipment article is an attachment device, that is attachable to, or arrangeable at, the work machine, or wherein the at least one electric equipment article is an auxiliary device which is electrically drivable by an electric motor, the flywheel generator being integrated into the combustion engine space;
   (ii) a power electronic device connected to the output of the flywheel generator for adapting a voltage level provided by the flywheel generator to a voltage level required for the operation of the at least one electric equipment article; and
   (iii) a connector device connectable to the power electronic device and the at least one electric equipment article when the at least one electric equipment article is attached to, or arranged at, the work machine for providing the at least one electric equipment article with electric power at the adapted voltage level, wherein the work machine con rises a combustion engine and the flywheel generator is arranged on an output shaft of the combustion engine, wherein an energy buffer is coupled to the flywheel generator and/or the power electronic device, and wherein the energy buffer is chargeable by the flywheel generator separate from a charging system of a starter battery of the combustion engine.

2. The electric operating system arrangement according to claim 1, wherein the energy buffer is a storage battery with an electrical potential of at least twice of the electrical potential of the starter battery of the combustion engine.

3. The electric operating system arrangement according to claim 1, wherein the energy buffer has an electric potential between ca. 50 and Ca. 1000 volt.

4. The electric operating system according to claim 1, wherein the at least one electric equipment article is a magnetic plate magnetized by an electromagnet.

5. The electric operating arrangement according to claim 1, wherein the flywheel generator is arranged on the output shaft between the combustion engine and a hydraulic pump.

6. A work machine comprising a combustion engine and an electric operating system according to claim 1.

7. The work machine according to claim 6, wherein at least one additional energy buffer is provided and wherein the additional energy buffer is charged by the flywheel generator separate from a starter battery of the combustion engine.

8. The work machine according to claim 6, wherein the flywheel generator is arranged on an output shaft of the combustion engine.

9. The work machine according to claim 8, wherein the flywheel generator is arranged on the output shaft between the combustion engine and a hydraulic pump.

10. The work machine according to claim 6, wherein the electric equipment article is an attachment device that is attachable to, or arrangeable at, the work machine, or wherein the electric equipment article is electrically drivable by an electric motor.

11. The work machine according to claim 10, wherein the attachment device is a magnetic plate.

* * * * *